June 4, 1974 B. J. CARLSSON 3,814,787
METHOD AND APPARATUS FOR CONVEYING SLABS OF PARTICULATE, FIBROUS
MATERIAL FROM A COMMON SLAB FORMING APPARATUS TO
HOT PRESSES ASSOCIATED THEREWITH
Filed May 26, 1972 4 Sheets-Sheet 1
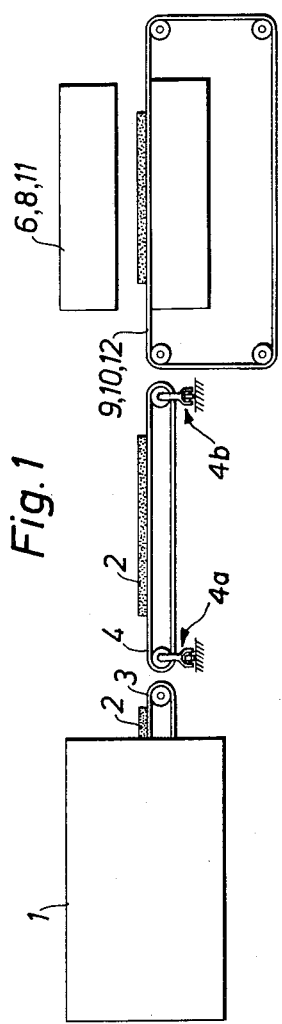
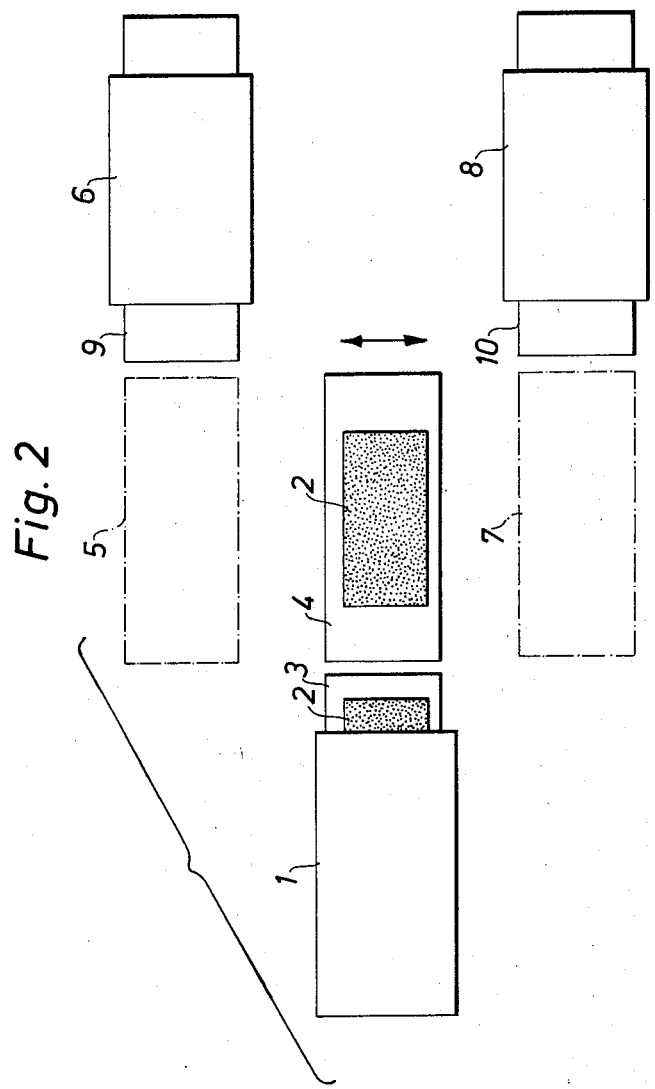

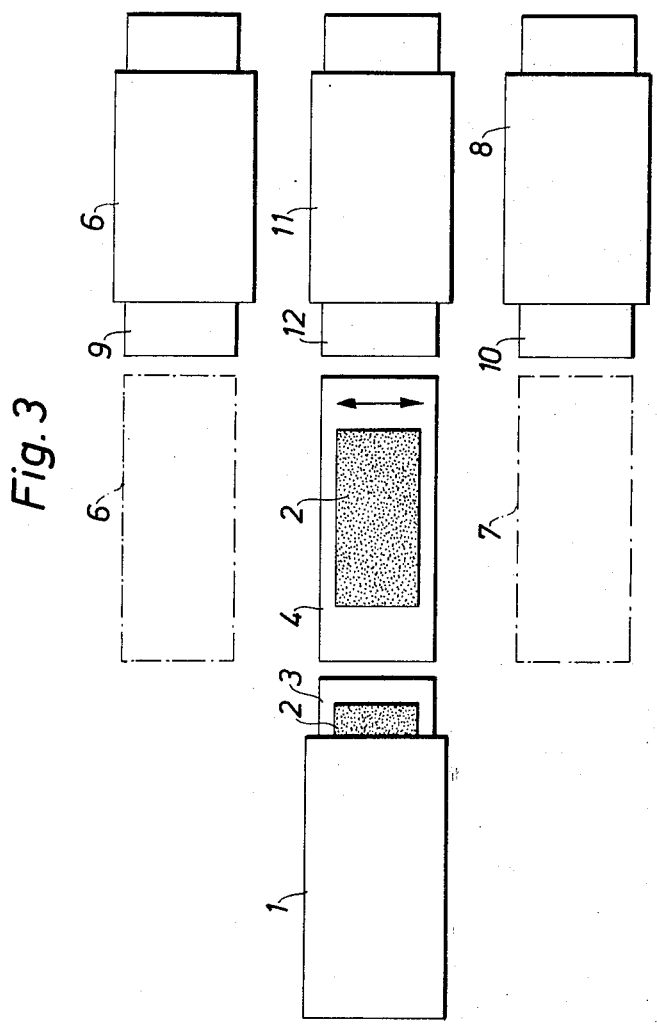

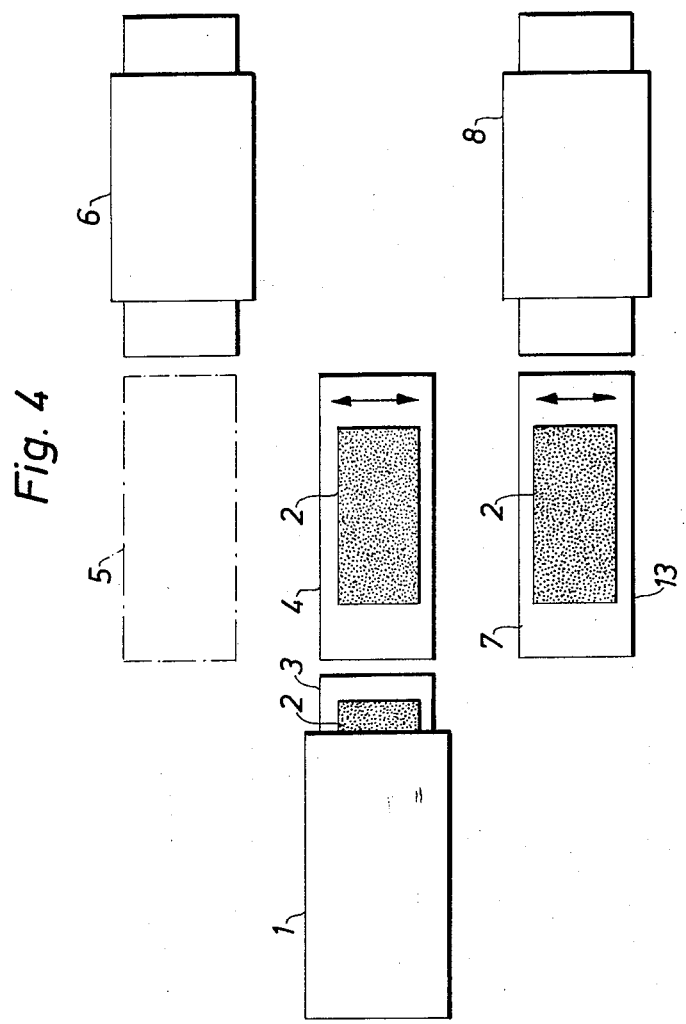

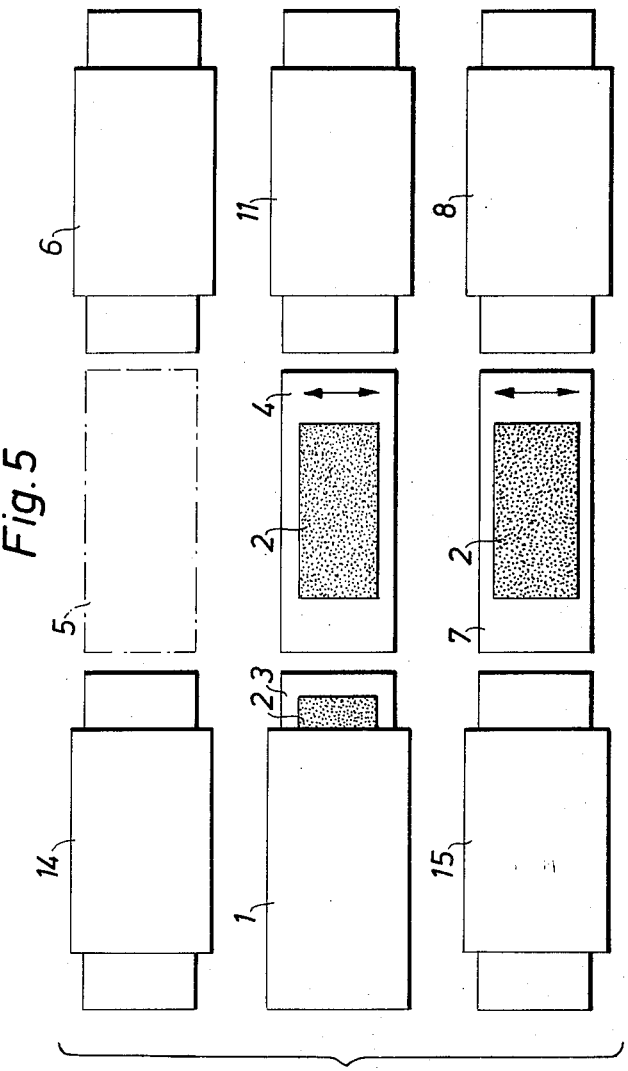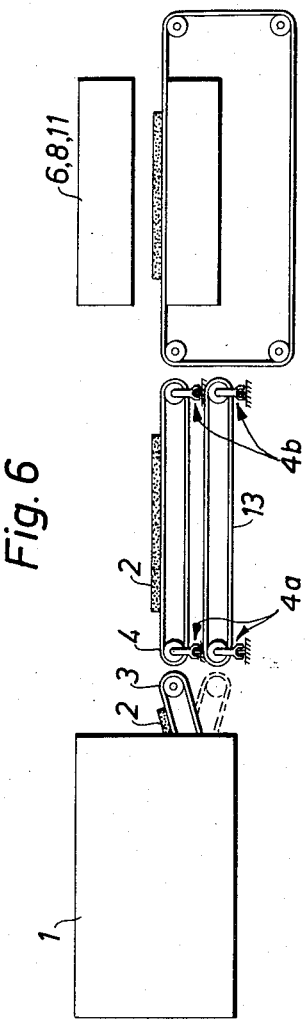

3,814,787
METHOD AND APPARATUS FOR CONVEYING SLABS OF PARTICULATE, FIBROUS MATERIAL FROM A COMMON SLAB FORMING APPARATUS TO HOT PRESSES ASSOCIATED THEREWITH

Bengt J. Carlsson, Motala, Sweden, assignor to
AB Motala Veekstad, Motala, Sweden
Filed May 26, 1972, Ser. No. 257,227
Claims priority, application Sweden, June 8, 1971,
7,419/71
Int. Cl. B29j 5/00
U.S. Cl. 264—109                              6 Claims

ABSTRACT OF THE DISCLOSURE

Particle slabs produced by a single particle slab forming apparatus are charged into at least two single layer presses, each of which provides a single opening for pressing slabs. The slabs produced are introduced alternately into respective ones of two, three, four and five single layer presses by transversely movable charging means. The transversely movable charging means is mounted to move slabs transversely from a belt conveyor at the discharge end of the slab forming apparatus to positions opposite transversely arranged separate single-stage hot presses.

---

The present invention relates to a method for conveying particle board and the like from an apparatus, arranged to serve one or two singled-layer presses, to the presses and means by carrying out the method.

In the manufacture of particle board and the like, cakes or slabs are formed from chips, shavings and like material and conveyed to a hot press, in which the slabs are pressed to form particle board, fibre board or the like. When proceeding in accordance with one known method, a single-layer hot press is used, i.e. a press in which only one slab is pressed at a time. In order to obtain the desired production rate, such presses are normally of relatively wide and long construction, and may reach to about 2.5 meters in width and 15 meters in length. When desiring greater capacity, it is necessary, for several reasons, to divide the production and to install two or more presses, each provided with equipment for forming and conveying the slabs. This duplication of the apparatus required for forming and conveying the slabs increases the installation costs and also the number of personnel required on the production line, this latter increase being out of proportion in relation to the capacity of the plant when compared with a system with which one single slab forming apparatus is used to serve all presses.

The object of the present invention is therefore to provide a method of feeding particle slabs to two or more single-layer presses from a slab forming apparatus which serves all presses. Another object of the invention is to provide means for carrying out the method.

The invention will now be described in more detail with reference to the accompanying drawings, in which FIG. 1 illustrates diagrammatically and in side view a particle slab forming apparatus having conveyor belts and a charging conveyor and an associated hot press.

FIG. 2 illustrates diagrammatically and in plan view a slab forming apparatus with conveyor belt and a charging conveyor and an associated hot press located on each side of the slab forming apparatus.

FIG. 3 illustrates diagrammatically and in plan view a slab forming apparatus with conveyor belt and a charging conveyor, with an associated hot press located on either side and in the middle of the slab forming apparatus.

FIG. 4 illustrates diagrammatically and in plan view a slab forming apparatus with conveyor belt and two charging belts and an associated hot press located on either side of the slab forming apparatus.

FIG. 5 illustrates diagrammatically and in plan view a slab forming apparatus with conveyor belt and two charging belts, with five associated hot presses.

FIG. 6 illustrates diagrammatically and in side view a slab forming apparatus with a tiltable conveyor belt, two charging conveyors and an associated hot press.

Particle webs or slabs from which fibreboard or the like is made are formed in a particle slab forming apparatus 1, which produces and advances rectangularly shaped slabs 2. The construction of such slab forming apparatus is well known to those skilled in the art and will therefore not be described in detail. The outermost portion, illustrated to the right of FIG. 1, of the slab forming apparatus comprises a belt conveyor 3, by which the slabs are carried out of the slab forming apparatus and from which the discharged slabs 2 are directed and advanced to be received by a second conveyor 4, here called the charging conveyor. The charging conveyor which is arranged to move from the position illustrated in FIG. 2 opposite the slab forming apparatus 1 laterally to a position 5 located opposite a hot press 6, and to return to its starting position, said charging conveyor moving on each alternate run to a feeding position 7 located opposite a second hot press 8. When moving laterally to positions 5 and 7, the charging conveyor 4 conveys to said positions particle slabs 2, which are into the hot presses 6 and 8 transferred from the charging conveyor 4 to a belt 9 and 10 extending through and beneath the press, hereinafter called the press belts and introduced into the presses 6 and 8 thereby. The slabs are pressed on the belts 9, 10 subsequent to being introduced to the press, and are then conveyed out of the press by the belts. A typical support for facilitating lateral movement of charging conveyor 4 is illustrated schematically at 4a, 4b in FIG. 1.

In accordance with a modified embodiment, illustrated in FIG. 3, a third hot press 11 with associated press belt 12 is located opposite the slab forming apparatus and arranged to be charged by the same charging conveyor 4 transferring the slabs to the presses 6 and 8 located on both sides thereof. With this arrangement, every third slab 2 arriving from the slab forming apparatus 1 is introduced into the hot press 11 without the charging conveyor 4 being moved laterally and without the slab in question being stopped on the charging conveyor. The other two slabs are introduced alternately in the other two hot presses.

Another variation, illustration in FIG. 4, comprises a development on the method illustrated in FIGS. 1 and 2. In this embodiment, the charging conveyor 4 receives every alternate slab 2 arriving from the slab forming apparatus 1 and moves laterally to position 5, where the slab 2 is introduced into the hot press 6, whereafter the charging conveyor 4 returns to its starting position to receive a new slab 2. In a similar manner, a second charging conveyor 13 conveys slabs 2 laterally to position 7, where the slab 2 is introduced into the hot press 8.

In this arrangement, the arrangement of FIG. 4, the two charging conveyors 4 and 13 are so arranged that lateral movement thereof takes place simultaneously, uniformly and in the same direction. This embodiment enables the slabs 2 to be fed from the slab forming apparatus without lateral movement of the charging conveyors 4 and 13 from a position centrally of the slab forming apparatus 1 to respective hot presses and back again, which means that while a slab 2 is being transferred to the charging conveyor 4, a second slab 2 can be charged to the hot press 8 from the charging conveyor 13 and vice versa, i.e. while a slab 2 is being transferred to the charging conveyor 13 a second slab 2 can be charged to the hot press 6 from the charging conveyor 4.

Similarly to the embodiment of FIG. 3, the embodiment illustrated in FIG. 4 provides a third hot press 11 opposite the slab forming apparatus 1. With this embodiment, each third slab is charged to the hot press 11 without it being necessary to move laterally the charging conveyor 4 alternatively the charging conveyor 13 opposite the press and without the slab 2 in question being stopped on the conveyor.

Another variation of the method is illustrated in FIG. 5, according to which slabs 2 are charged, in addition to the aforementioned hot presses 6, 8 and 11 also to hot presses 14 and 15 by the charging conveyor 4 and 13 in the afore-described manner.

An alternative of the embodiment illustrated in FIG. 4, as illustrated in FIG. 6, is one in which each of the charging conveyors 4 and 13 is arranged in a respective plane, as are also the presses 6 and 8, of which only one is illustrated. The belt conveyor 3 is tiltably arranged to alternatively discharge slabs to the charging conveyors 4 and 13, whereby the time during which slabs 2 cannot be fed the slab forming apparatus can be reduced to some few seconds. The construction of the tiltable belt conveyor 3 can also be applied to the embodiment illustrated in FIG. 5.

Thus the method of this invention comprises the charging of slabs produced by a single particle slab forming apparatus into at least two separate single layer presses, each of which provides a single opening for pressing slabs. The slabs produced, depending upon the number of presses used are introduced alternately into respective ones of two, three, four and five single-layer presses. The charging means are transversely movable and arranged to introduce slabs into at least two single layer presses from one and the same forming apparatus. The transversely movable chraging conveyor is mounted to move slabs transversely from the belt conveyor at the discharge end of the slab forming apparatus to positions opposite the transversely arranged separate single-stage hot presses. Where there are two charging conveyors, they may be transversely movable independently.

The invention is not restricted to the described number of presses and charging conveyors or their orientation and neither to the production of fibreboard or the like, but can be modified within the scope of the accompanying claims.

I claim:

1. A method of manufacturing rectangular particle board slabs and the like in which the output of a single slab forming apparatus is efficiently and rapidly hot pressed comprising the steps of providing a plurality of separate single-layer hot presses, at least one of which is laterally out of line with said single slab forming apparatus, contiuously conveying a plurality of generally rectangular formed particle slabs out of the slab forming apparatus on a conveyor belt which is in line with said single slab forming apparatus, directing and advancing each particle slab from said conveyor belt onto charging conveyor means, moving and directing the particle slabs on the charging conveyor means alternately to a press feeding position at each of said plurality of single-layer hot presses, at least one of said alternate movements being in a direction laterally of the slab forming apparatus, transferring the particle slabs from said feeding positions on said charging conveyor means press belt means and introducing the particle slabs alternately into said plurality of single-layer hot presses, then pressing said particle slabs each alternately in its single-layer hot press.

2. A method according to claim 1, characterized in that the formed particle slabs are introduced alternately into respective ones of two single-layer presses, at least one of which is laterally out of line with said single slab forming apparatus.

3. A method according to claim 1, characterized in that the formed particle slabs are introduced alternately into respective ones of three single-layer presses, at least two of which are laterally out of line with said single slab forming apparatus.

4. A method according to claim 1, characterized in that the formed slabs are charged alternately into respective ones of five single-layer presses, four of which are laterally out of line with said single slab forming apparatus.

5. A method according to claim 1, in which said charging conveyor means comprises a laterally movable charging conveyor mounted to move laterally of said slab forming apparatus to and from a press feeding position at one of the laterally spaced separate single-stage hot presses.

6. A method according to claim 1, in which said charging conveyor means comprises two laterally movable charging conveyors mounted to move laterally of said slab forming apparatus to and from press feeding positions at laterally spaced separate single stage hot presses.

References Cited

UNITED STATES PATENTS

| 3,077,271 | 2/1963 | Siempelkamp | 214—16.6 |
| 2,878,728 | 3/1959 | Clark | 92—61 |
| 2,627,883 | 2/1953 | Littley | 144—281 |
| 3,542,629 | 11/1970 | Burkner | 156—558 |

DANIEL J. FRITSCH, Primary Examiner

U.S. Cl. X.R.

100—209; 156—62.2; 264—297; 425—80

UNITED STATES PATENT OFFICE
CERTIFICATE OF CORRECTION

Patent No. 3,814,787        Dated June 4, 1974

Inventor(s) Bengt J. Carlsson

It is certified that error appears in the above-identified patent and that said Letters Patent are hereby corrected as shown below:

The assignee "Veekstad" should be -- Verkstad --;

Column 2, line 22, "which" should be deleted;

line 52, "illustration" should be -- illustrated --;

Column 3, line 24, between "fed" and "the" insert -- from --;

line 38, "chraging" should be -- charging --;

(Claim 1), Column 4, line 2, "contiuously" should be -- continuously --;

line 13, between "means" (first occurrence) and "press" insert -- to --

Signed and sealed this 24th day of September 1974.

(SEAL)
Attest:

McCOY M. GIBSON JR.
Attesting Officer

C. MARSHALL DANN
Commissioner of Patents